Patented Mar. 7, 1944

2,343,773

UNITED STATES PATENT OFFICE 2,343,773

NITRO-CHROMANE

Otto Hromatka, Darmstadt, Germany, assignor to Merck & Co., Inc., Rahway, N. J., a corporation of New Jersey No Drawing. Application July 18, 1941, Serial No. 402,955. In Germany January 31, 1939

10 Claims. (Cl. 260—333)

This application is a continuation-in-part of my application Serial No. 307,265, filed December 2, 1939.

This invention relates to organic chemical compositions and compounds of the chromane and substituted chromane type, to intermediates for the production of such compounds, and to processes for their production.

Such chromanes and substituted chromanes exhibit the biological action of the tocopherols, i. e., vitamin E.

The syntheses of such compounds now available involve the use of hydroquinones as starting materials. For instance, one of the known processes involves the use of pseudocumohydroquinone (3,6-dihydroxy-1,2,4-trimethyl benzene) with phytol or phytol derivatives. Pseudocumohydroquinone is a difficultly obtainable substance, and the processes now known for its production are impracticable and result in only very small yields.

Furthermore, pseudocumohydroquinone is sensitive to oxidation, and solutions of it become dark-colored unless all traces of oxygen are eliminated, which is difficult from a practical and technical standpoint; consequently, dark-colored reaction products are obtained. Dark coloration and contamination by oxidation is particularly noticeable in the treatment of the crude chromane obtained from pseudocumohydroquinone, with methyl alcoholic potassium hydroxide. However, the treatment with methyl alcoholic potassium hydroxide is necessary, if, as has been suggested, the chromane synthesis from pseudocumohydroquinone and phytol is carried out by means of organic acids, because esters are thus produced, which must be saponified.

When xylohydroquinone is reacted with phytol or phytol derivatives a mixture of several substances is obtained in addition to the desired hydroxy chromane, such as condensation products formed by the substitution of two phytyl radicals in the molecule.

According to the determinations of Karrer and his co-workers (Helv. Chim. Acta, vol. 21, pages 823–1234; vol. 22, page 661) such by-products can only be separated with great difficulty from the reaction product desired.

It will be apparent, then, that the processes now available for synthesis of the chromanes have many disadvantages and are unsatisfactory from the practical viewpoint.

I have now discovered a new synthesis for these important biologically active products, which synthesis avoids the use of hydroquinones as starting materials. My process involves the use of 6-hydroxybenzenes of the formula

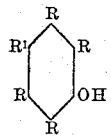

wherein R may be hydrogen or methyl, one R ortho to the hydroxyl group always being hydrogen, and $R^1$ may be a group selected from the group consisting of amino, amino hydrochloride, acylamino and nitro radicals as starting material. These compounds are condensed with dienes such as phytadiene, dimethylbutadiene, isoprene, etc., or with allylic halides such as, for example, phytyl bromide, dimethyl allyl bromide, etc., or the corresponding alcohols, such as phytol, for example, to produce chromanes which are substituted in position 2 by an alkyl radical, and in position 6 by an amino, amino hydrochloride, acylamino, or nitro radicals. The reaction may be carried out in the presence of an acidic catalyst, such as zinc chloride, or formic acid, for example.

6-hydroxybenzenes substituted at position 3 by amino, acylamino, benzylamino, or nitro radicals, may be employed in the process according to my invention. Particularly suitable are the 6-hydroxy-3-amino- or 3-nitrobenzenes.

The present application is more particularly concerned with the production of chromanes from 6-hydroxy-3-nitrobenzenes and phytol or phytol derivatives.

Where 3-nitrobenzenes are employed as starting materials in the reaction, the nitro group is converted to an amino group. The products of the reaction between 3-nitrobenzenes and the phytol or phytol derivatives, or allyl halides are worked up in such a manner that residues of the 3-nitro-6-hydroxybenzenes used may be eliminated by means of aqueous alkalis. Because of the presence of the nitro group, the acid nature of the phenolic hydroxyl group appears to be intensified, and therefore these compounds can be shaken out even with dilute or weakly alkaline materials, for example, with soda solution, and the 6-nitrochromane derivatives, which are easily soluble in alcohol, can be separated from the conversion products that are insoluble in alcohol, and can be purified by chromatographing or by distillation under high vacuum. It is also possible to catalytically hydrogenate the alcoholic solution of the unpurified substituted 6-nitrochromane, and then purify the substituted 6- aminochromane thus obtained by chromatographing its benzine solution on aluminum oxide, or by the salt formation.

It is also possible according to my invention to isolate the obtained 6-aminochromane derivatives by means of their salts with organic dibasic acids such as oxalic acid, d-tartaric acid or malic acid in the molecular proportion of one molecule of the 6-aminochromane and half a molecule of the acid. These well crystallizing salts are sparingly soluble in alcohol.

The 3-nitro-6-hydroxybenzenes which may be employed as starting materials for the processes of my invention are stable compounds and are not susceptible to atmospheric oxygen. They are readily soluble in the organic solvents used in the condensation, as for example, in benzine or in formic acid. The 6-nitrochromanes obtained in the condensation are likewise not subject to oxidation. Furthermore, they can be readily distilled under high vacuum without decomposition and can thus be easily separated from any byproducts.

The 3-aminochromanes obtained according to my invention may be converted to 6-hydroxychromanes by diazotizing and boiling, even though these compounds have very weakly basic properties, their salts being usually hydrolyzed completely with water, and the base being shaken out with ether. Diazotization may be successfully carried out even in spite of the very high general susceptibility to oxidation of amines of this type. I have found that on boiling an aqueous alcoholic solution of the diazonium salts, there occurs chiefly a combination with the hydroxyl group instead of with the originally present amino group, and not, as is usually the case when boiling alcoholic solutions of diazonium salts, a combination with an —$OC_2H_5$ group or with a hydrogen atom.

The 6-aminochromanes obtained as intermediates in the present process can also be converted into 6-hydroxychromanes, i. e., alpha-tocopherol or its homologs, by oxidation, hydrolysis of the quinonimines thus obtained, and hydrogenation of the quinones. The reduction or hydrogenation may be effected with zinc dust or with other usual reducing agents, in presence of acids.

When 3-nitro- or 3-amino-1,2,4,-trimethyl-6-hydroxybenzenes are employed in the reaction, the corresponding alkylated 6-hydroxychromane is obtained which is identical with d,l-alpha-tocopherol, as determined by the absorption spectrum, by formation of the allophanate derivative, and by the high vitamin E activity which it exhibits on animals.

When higher or lower homologs of 3-nitro- or 3-amino-1,2,4-trimethyl-6-hydroxybenzenes are employed, the resulting product is a corresponding higher or lower homolog of d,l-alpha-tocopherol.

The products produced according to my invention exhibit a high degree of vitamin E activity. Furthermore, the 6-acylaminochromanes and the free 6-aminochromanes which can be used advantageously in the form of their crystalline salts, also exhibit a high degree of vitamin E activity; d,l-alpha-tocopherol itself does not form crystalline salts.

In the following examples there are given detailed descriptions of the various reactions referred to herein. However, it will be apparent to those skilled in the art that various modifications may be made therein without departing from the spirit and scope of the invention herein described and claimed.

*Example I*

1.8 gm. of 3-nitro-6-hydroxy-1,2,4-trimethyl benzene, M. P. 82° (prepared by cleaving 3-nitro-6-methoxy-1,2,4-trimethylbenzene with concentrated hydrochloric acid under pressure at 150°), 3.0 gm. phytol and 15 cc. of formic acid are refluxed for two hours. After cooling, the mixture is dissolved in ether and the solution extracted several times with water. Thereupon, the ether solution is washed with diluted sodium hydroxide and finally with diluted hydrochloric acid. The ether solution is dried and evaporated, the residue dissolved in petroleum ether and chromatographed upon aluminum oxide according to Brockmann. Treatment with the same solvent is continued until the yellow zone fills out the entire column. The petroleum ether run contains the reaction products of phytol. After the separation of a narrow dark yellow zone at the upper end of the column, the mixture is eluted with ether to which some methanol has been added. The eluate is evaporated and leaves a light yellow oil: 2,5,7,8-tetramethyl-2-(4',8',12'-trimethyl-tridecyl)-6-nitrochromane.

1.3 gm. of this compound are dissolved in 50 cc. of absolute alcohol, treated with 0.5 HCl, $d=1.19$, and after addition of 2 gm. 10% palladium charcoal, are shaken with hydrogen at room temperature. In six hours 195 cc. of hydrogen are taken up. After filtering off the catalyst, the solution is evaporated in vacuo. The residue is dissolved hot in 10 cc. of alcohol and precipitated with a hot solution of 0.2 gm. of oxalic acid in 2 cc. alcohol. Upon cooling, the oxalate of 2,5,7,8-tetramethyl-2-(4',8',12'-trimethyl-tridecyl) - 6 - aminochromane, M. P. 153°, crystallizes.

The free base may be prepared from the oxalate. With alcoholic HCl the hydrochloride is formed from the base.

0.932 gm. of 2,5,7,8-tetramethyl-2-(4',8',12'-trimethyl - tridecyl)-6 - aminochromane - hydrochloride are dissolved in 8 cc. alcohol and mixed with 0.5 cc. 35% HCl. The solution is cooled with ice and mixed dropwise with 2.2 cc. of a normal sodium nitrite solution. The cool solution is allowed to stand for a prolonged period, thereafter is diluted with 150 cc. of water and the solution boiled under a reflux condenser while passing through an inert gas. Nitrogen is evolved. Simultaneously, an oil separates. The latter is taken up with petroleum ether, chromatographed and developed with petroleum ether. The colorless white zone, bounded by two yellow zones, is eluted with ether plus methanol (9 plus 1). The oil remaining after the evaporation of the solvent is d,l-alpha-tocopherol.

The amino chromane may also be converted into d,l-alpha-tocopherol by the following procedure:

*Example II*

0.932 gm. of 2,5,7,8-tetramethyl-2-(4',8',12'-trimethyl - tridecyl)-6-aminochromane hydrochloride are dissolved in 7 cc. of warm absolute alcohol and mixed with 20 cc. of water whereby the solution becomes turbid. After adding 6 cc. of Liquor Ferri sesquichlorati DAB. 6, the mixture is heated on the steam bath for 1½ hours. A brown oil is formed which is extracted with ether. The residue after evaporation of the ether solution is reduced with excess of zinc dust in aqueous alcoholic HCl, the colorless solution is then diluted with water, the separated d,l-alpha-tocopherol dissolved with petroleum ether and purified by chromatographing upon aluminum oxide. The compound is eluted with ether-methanol. The residue is d,l-alpha-tocopherol.

*Example III*

3.34 gms. of 3-nitro-6-hydroxy-2,4-dimethylbenzene, 6.0 gms. of phytol and 30 cc. of 99% formic acid are boiled for five hours under refluxing. After cooling, the mixture is diluted with water and the yellow oil which separates out is taken up in ether. The ether solution is drawn off and treated with dilute sodium hydroxide solution until the solution turns an orange-red color (phenolphthalein-alkaline reaction). After separation of the layers, the ether solution is dried and evaporated.

The residue is dissolved in a little alcohol, in which the substituted nitrochromane is soluble, whereas a few drops of the oil remain undissolved. The solution is evaporated to dryness and the residue is distilled under vacuum at 0.05 mm. and in air bath temperature of 170-200° C. 2,5,7-trimethyl-2-(4',8',12'-trimethyl-tridecyl)-6-nitrochromane in the form of a yellow oil is obtained.

2.17 gms. of 2,5,7-trimethyl-2-(4',8',12'-trimethyl-tridecyl)-6-nitrochromane is dissolved in 80 cc. of alcohol, treated with 1 cc. of hydrochloric acid ($d=1.19$), and after the addition of 2 gms. of 10% palladium charcoal, is hydrogenated catalytically. When the calculated amount of hydrogen is absorbed, the solution is filtered from the catalyst and evaporated under vacuum. The crystallized residue is 2,5,7-trimethyl-2-(4',8',12'-trimethyl-tridecyl)-6-aminochromane hydrochloride and is recrystallized from dilute alcoholic hydrochloric acid.

2,5,7-trimethyl-2-(4',8',12'-trimethyl-tridecyl)-6-p-nitrobenzaminochromane, obtained from the base with p-nitrobenzoyl chloride in a pyridine solution shows a melting point of about 147° C.

*Example IV*

3.34 gms. of 3-nitro-6-hydroxy-2,4-dimethylbenzene are boiled for five hours under refluxing with 1.8 gms. of anhydrous zinc chloride and 7.5 gms. of phytyl bromide in 25 cc. of benzine having a boiling point of 80-120° C. Hydrobromic acid escapes. The mixture is taken up in ether. The ethereal solution is shaken out with dilute sodium hydroxide solution and thereafter with dilute hydrochloric acid. The ether solution is dried and evaporated. The further working up to 2,5,7-trimethyl-2-(4',8',12'-trimethyl-tridecyl)-6-amino-chromane takes place as described in Example I.

I claim:

1. The process for the production of 2,5,7,8-tetramethyl-2-(4',8',12'-trimethyl-tridecyl)-6-nitro-chromane comprising reacting 6-hydroxy-3-nitro-1,2,4-trimethylbenzene with phytol, in the presence of an acidic substance.

2. The process for the production of 2,5,7,8-tetramethyl-2-(4',8',12'-trimethyl-tridecyl)-6-nitro-chromane comprising reacting 6-hydroxy-3-nitro-1,2,4-trimethyl benzene with phytyl bromide, in the presence of an acidic substance.

3. The process for the production of 2,5,7,8-tetramethyl-2-(4',8',12'-trimethyl-tridecyl)-6-nitro-chromane comprising reacting 6-hydroxy-3-nitro-1,2,4-trimethyl benzene with phytadiene, in the presence of an acidic substance.

4. 2,5,7,8-tetramethyl-2-(4',8',12'-trimethyl-tridecyl)-6-nitrochromane.

5. 2,5,7-trimethyl-2-(4',8',12'-trimethyl-tridecyl)-6-nitrochromane.

6. Process for the production of compounds of the formula

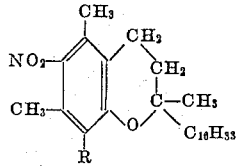

wherein R is selected from the group consisting of hydrogen or a methyl radical, comprising reacting a product of the formula

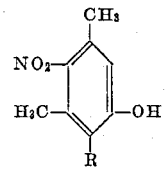

wherein R is selected from the group consisting of hydrogen and methyl, with a substance selected from the group consisting of phytol, phytyl bromide, and phytadiene, in the presence of an acidic substance.

7. A process for the production of 2,5,7-trimethyl-2-(4',8',12'-trimethyl-tridecyl)-6-nitrochromane comprising reacting 6-hydroxy-3-nitro-2,4-dimethylbenzene with phytol in the presence of an acidic substance.

8. A process for the production of 2,5,7-trimethyl-2-(4',8',12'-trimethyl-tridecyl)-6-nitrochromane comprising reacting 6-hydroxy-3-nitro-2,4-dimethylbenzene with phytyl bromide in the presence of an acidic substance.

9. A process for the production of 2,5,7-trimethyl-2-(4',8',12'-trimethyl-tridecyl)-6-nitrochromane comprising reacting 6-hydroxy-3-nitro-2,4-dimethylbenzene with phytadiene in the presence of an acidic substance.

10. A product of the formula

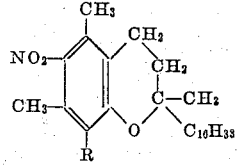

wherein R is selected from the group consisting of hydrogen or a methyl radical.

OTTO HROMATKA.